DESIGN.

R. STAHL.

RADIATOR FOR AUTOMOBILES.

FILED APR. 23, 1920.

Jan. 9, 1923. Re. 15,523.

Inventor

RODOLPHE STAHL.

By Raymond A. Parker

Attorney

Reissued Jan. 9, 1923.

Re. 15,523

UNITED STATES PATENT OFFICE.

RODOLPHE STAHL, OF DETROIT, MICHIGAN, ASSIGNOR, BY MESNE ASSIGNMENTS, TO THE BRISCOE & STAHL CO., OF DETROIT, MICHIGAN, A CORPORATION OF MICHIGAN.

DESIGN FOR A RADIATOR FOR AUTOMOBILES.

Original No. 59,876, dated November 29, 1921, Serial No. 376,151, filed April 23, 1920, for 3½ years. Application for reissue filed January 13, 1922. Serial No. 193. Term of patent 7 years.

*To all whom it may concern:*

Be it known that I, RODOLPHE STAHL, a citizen of the United States, residing at the city of Detroit, in the county of Wayne, State of Michigan, have invented a new, original, and ornamental Design for Radiators for Automobiles, of which the following is a specification, reference being had to the accompanying drawing, forming a part thereof.

Figure 1:
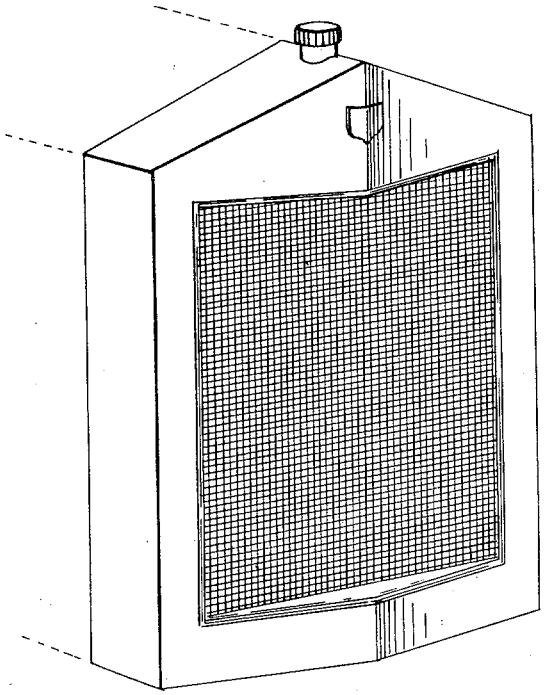
Figure 1 is a perspective view showing a radiator embodying my new design.
Figure 2:
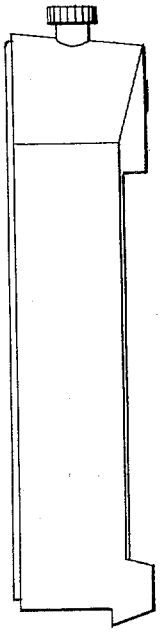
Fig. 2 is a side elvation of the same.
Figure 3:
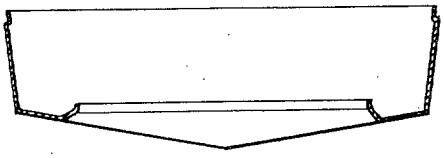
Fig. 3 is a horizontal section through the frame illustrating more clearly the contour thereof.

A feature of the design is the straight line formation together with the upper and lower portions extending outward from the sides of the radiator and meeting in a line substantially at the center vertical transverse plane thereof.

I claim:

An ornamental design for a radiator for automobiles as shown.

RODOLPHE STAHL.